United States Patent
Mastrolia (10) Patent No.: US 9,718,551 B2
(45) Date of Patent: Aug. 1, 2017

(54) FRONTAL ENTRY PHONE CORD FUNNEL

(71) Applicant: Goodrich Corporation, Charlotte, NC (US)

(72) Inventor: Bradley Mastrolia, Coloado Springs, CO (US)

(73) Assignee: Goodrich Corporation, Charlotte, NC (US)

( * ) Notice: Subject to any disclaimer, the term of this patent is extended or adjusted under 35 U.S.C. 154(b) by 118 days.

(21) Appl. No.: 14/801,112

(22) Filed: Jul. 16, 2015

(65) Prior Publication Data

US 2017/0015421 A1    Jan. 19, 2017

(51) Int. Cl.

| | |
|---|---|
| *B64D 11/06* | (2006.01) |
| *B64D 11/00* | (2006.01) |
| *B60N 2/48* | (2006.01) |
| *B60N 2/64* | (2006.01) |
| *B60R 11/00* | (2006.01) |

(52) U.S. Cl.
CPC ........ *B64D 11/0627* (2014.12); *B60N 2/4876* (2013.01); *B64D 11/00155* (2014.12); *B60N 2/64* (2013.01); *B60R 2011/0015* (2013.01)

(58) Field of Classification Search
CPC .......... B64D 11/0627; B64D 11/00155; B60N 2/4876; B60N 2/64; B60R 2011/0015
USPC ............... 439/34; 403/205; 297/217.4, 217.3
See application file for complete search history.

(56) References Cited

U.S. PATENT DOCUMENTS

| | | | |
|---|---|---|---|
| 308,502 A | 11/1884 | Kurreick | |
| 967,117 A | 8/1910 | Durand | |
| 1,470,183 A | 10/1923 | O'Brien | |
| 4,489,902 A | 12/1984 | Chaconas et al. | |
| 5,128,993 A | 7/1992 | Skowronski | |
| 5,523,538 A | 6/1996 | Matsuda | |
| 5,612,999 A * | 3/1997 | Gardenhour, Jr. | H04M 1/15 |
| | | | 379/437 |
| 5,732,898 A | 3/1998 | Odessky et al. | |
| 6,087,587 A | 7/2000 | Gonzalez | |
| 6,860,554 B2 * | 3/2005 | Lambiaso | B64D 11/0624 |
| | | | 297/188.04 |
| 2003/0136795 A1 | 7/2003 | Juan | |
| 2011/0062039 A1 | 3/2011 | Prokop | |

FOREIGN PATENT DOCUMENTS

| | | |
|---|---|---|
| WO | 9915742 | 4/1999 |
| WO | 03020588 A1 | 3/2003 |

OTHER PUBLICATIONS

Extended European Search Report, for European Patent Application No. 16179896.2, dated Dec. 22, 2016, 9 pages.

* cited by examiner

*Primary Examiner* — Milton Nelson, Jr.
(74) *Attorney, Agent, or Firm* — Kinney & Lange, P.A.

(57) ABSTRACT

A storage assembly includes a housing with an opening manifold on an outer surface of the housing. The opening manifold is capable of receiving a cord. A first end of the cord is connected to an electrical outlet disposed within the housing. The opening manifold includes a first aperture and a second aperture. The first aperture extends across a first plane. The second aperture extends across a second plane positioned substantially orthogonal to the first plane.

19 Claims, 5 Drawing Sheets

Fig. 1

PRIOR ART

Fig. 2

PRIOR ART

FRONTAL ENTRY PHONE CORD FUNNEL

BACKGROUND

The present disclosure is directed generally to a storage assembly for a cord, and more specifically, to a storage assembly for a telephone cord in a jump-seat of an aircraft.

Aircraft flight attendant seats, or jump-seats, have telephone cords that get in the way of the occupants when they are not completely stowed inside the seat. In previous designs, stowing of the telephone cord can be hindered by getting caught on the edge of the seat, as well as the user being required to maneuver the telephone cord through a large amount of space to properly operate the stowing functionality of the seat.

SUMMARY

A storage assembly includes a housing with an opening manifold on an outer surface of the housing. The opening manifold is capable of receiving a cord. A first end of the cord is connected to an electrical outlet disposed within the housing. The opening manifold includes a first aperture and a second aperture. The first aperture extends across a first plane. The second aperture extends across a second plane positioned substantially orthogonal to the first plane.

A storage assembly for a chord includes a housing connected to a seat of an aircraft. An opening manifold is disposed on an outer surface of the housing. The opening manifold includes a first aperture and a second aperture. The first aperture extends across a first plane. The second aperture extends across a second plane positioned substantially orthogonal to the first plane. The second aperture is further positioned generally normal to a direction of gravity. A cord extends through the opening manifold. A first end of the cord is connected to an electrical outlet disposed within the housing and a second end of the cord is connected to a communication device.

A method of storage includes connecting a housing to a seat of an aircraft. An opening manifold is disposed on an outer surface of the housing. The opening manifold includes a first aperture and a second aperture. The first aperture extends across a first plane. The second aperture extends across a second plane positioned substantially orthogonal to the first plane and generally normal to a direction of gravity.

DETAILED DESCRIPTION

Figure 1:
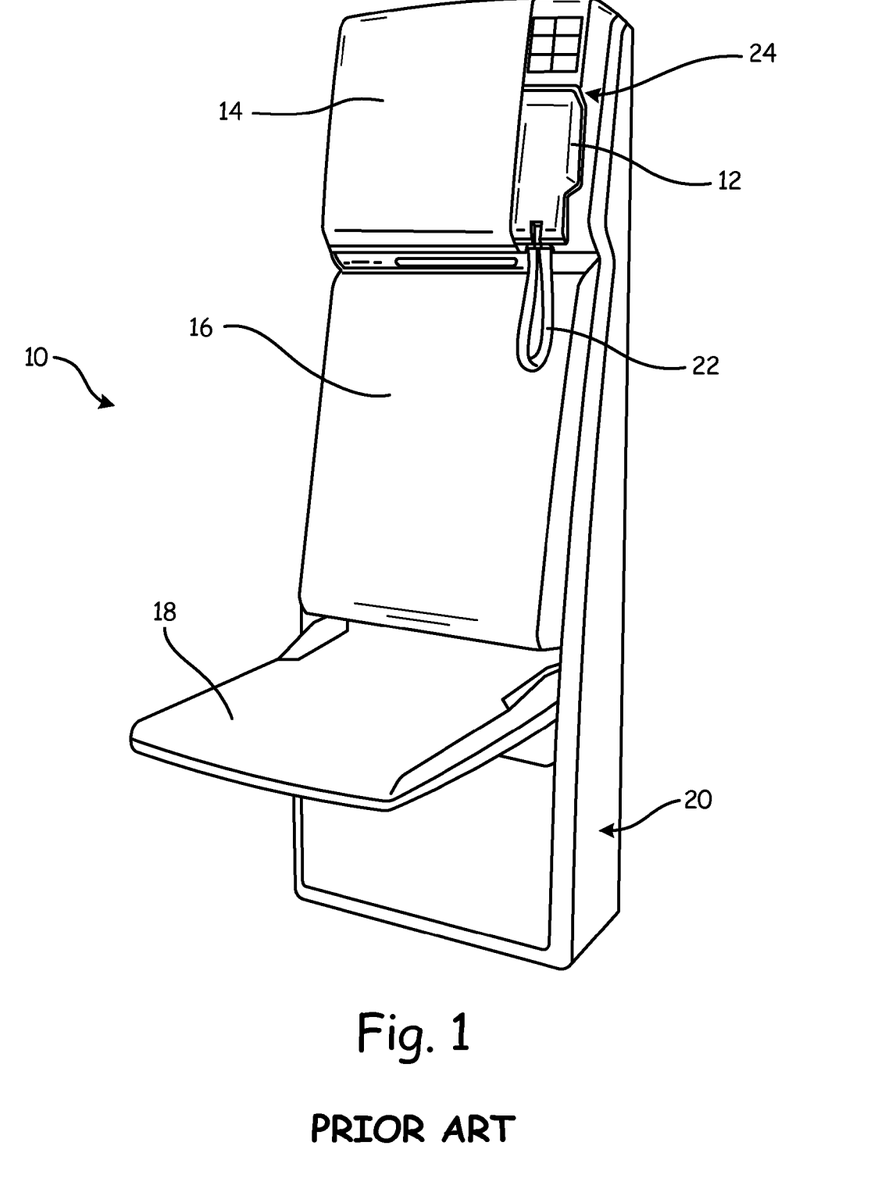
FIG. 1 is a perspective view of a prior art seat with a telephone.

FIG. 1 is a perspective view of seat 10 with telephone 12 known in the art. Seat 10 includes telephone 12, headrest 14, backrest 16, seat bottom 18, and base 20. Telephone 12 includes cord 22 and is shown as stowed in receiver 24. Headrest 14 is affixed along a top portion of seat 10. Backrest 16 is affixed along a middle portion of seat 10. Seat bottom 18 is pivotally attached to a lower portion of seat 10. Base 20 includes the bottom portion of seat 10 and connects to the floor of an aircraft (not shown).

Seat 10 is configured to allow a flight attendant to occupy seat 10 during take-off and landing, while also saving space during in-flight activities. Pivotally attached seat bottom 18 swivels outward to allow an occupant to sit on seat bottom 18. Seat bottom 18 swivels upward into a stowed position when not being sat upon by an occupant.

Telephone 12 is configured to allow a flight attendant to communicate with other occupants on the aircraft during take-off, flight, and landing. When in use, telephone 12 is removed from receiver 24 and is used to send and receive communication(s). Once communication(s) by the flight attendant have been completed, telephone 12 is stowed in receiver 24. Stowage of telephone 12 in receiver 24 includes mechanically attaching telephone 12 to receiver 24.

Cord 22 of seat 10 is not stored and dangles unrestricted from telephone 12. Cord 22 can get tangled or caught on seat 10 itself or on various other objects and/or occupants that move about the cabin of the aircraft.

Figure 2:
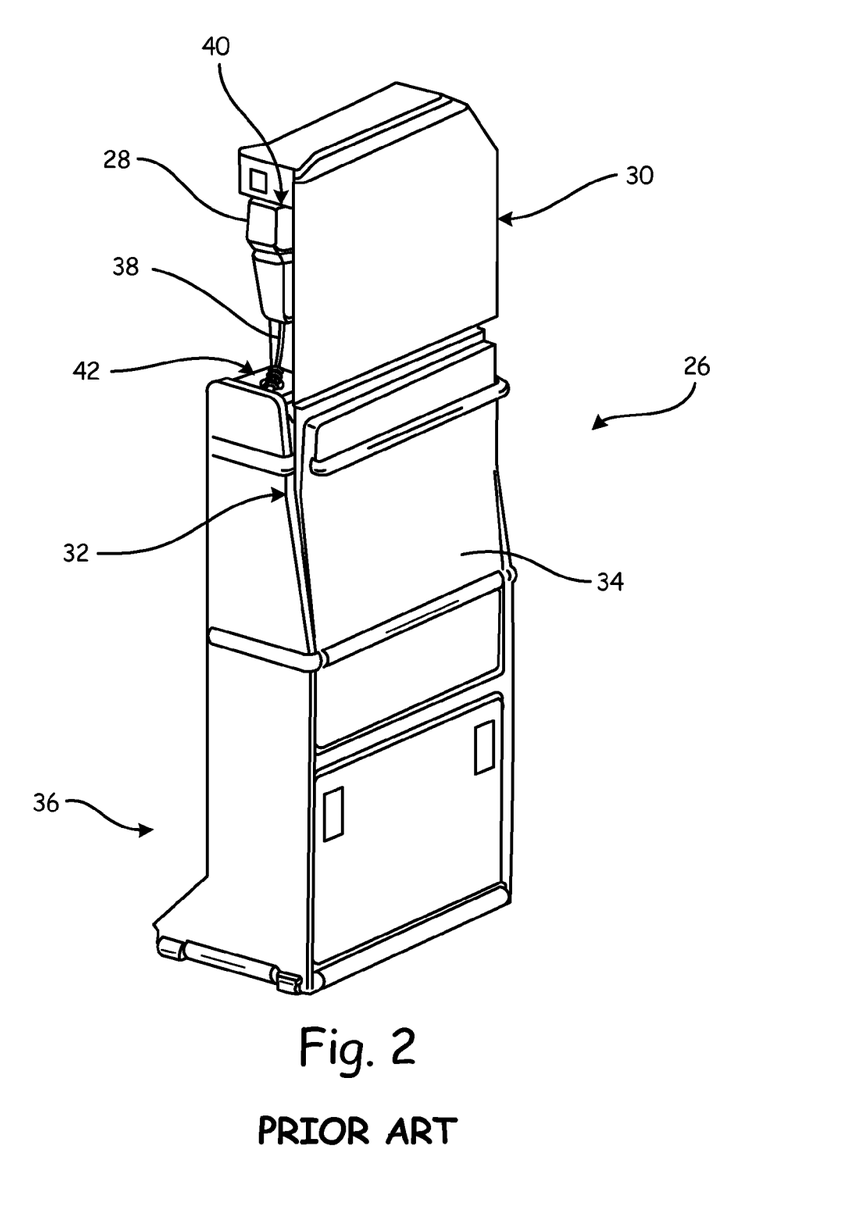
FIG. 2 is a perspective view of a prior art seat with a telephone.

FIG. 2 is a perspective view of seat 26 with telephone 28 known in the art. Seat 26 includes telephone 28, headrest 30, backrest 32, seat bottom 34, and base 36. Telephone 28 includes cord 38 and is shown as stowed in receiver 40. Headrest 30 is affixed along a top portion of seat 26. Backrest 32 is affixed along a middle portion of seat 26. Seat bottom 34 is pivotally attached to a lower portion of seat 26. In FIG. 2, seat bottom 34 is shown in an upright stowed position. Base 36 includes the bottom portion of seat 26 and connects to the floor of an aircraft (not shown).

Cord 38 extends through hole 42 and into seat 26. Hole 42 may include a funnel shaped feature to guide cord 38 into seat 26. The funnel shaped feature of hole 42 allows cord 38 to be stored behind backrest 32 in seat 26.

A number of prior art designs include an upward facing funnel shaped feature allowing cord 38 to drop into a cavity behind backrest 32. Gravity is used to drop cord 38 into the funnel shaped feature of hole 42. A problem with the design of seat 26 is that cord 38 is not always easily pulled out of and/or dropped into the funnel shaped feature of hole 42. There tends to be a limited amount of space to include large, smooth side surfaces in the funnel shaped feature of hole 42. Cord 38 tends to get caught on the edges of the funnel shaped feature of hole 42. Another problem is the upward facing funnel shaped feature of hole 42 tends to require more space to operate, and space is a valuable commodity on an aircraft.

Figure 3:
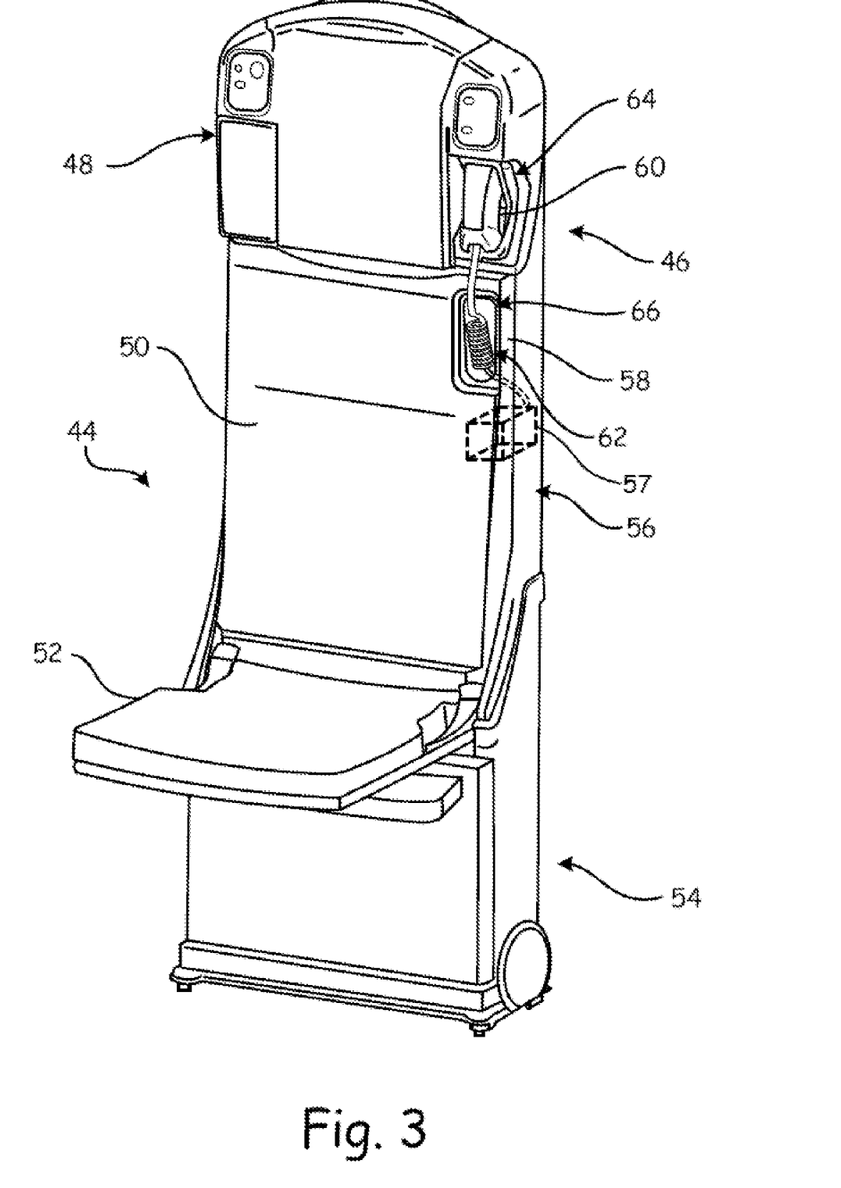
FIG. 3 is a perspective view of a seat with a communication device.

FIG. 3 is a perspective view of seat 44 with communication device 46. Seat 44 includes communication device 46, headrest 48, backrest 50, seat bottom 52, and base 54. Seat 44 also includes housing 56 which is positioned behind backrest 50. Headrest 48 is affixed along a top portion of seat 44. Backrest 50 is affixed along a middle portion of seat 44 and onto outer surface 58 of housing 56. Seat bottom 52 is pivotally attached to a lower portion of seat 44. Base 54 includes the bottom portion of seat 44 and connects to the floor of an aircraft (not shown). Housing 56 includes electrical outlet 57 (shown in phantom) disposed within housing 56.

Communication device 46 may include a telephone. Communication device 46 may include handset 60 and cord 62. Handset 60 may include a microphone and a speaker. Communication device 46 may also include a microphone, an ear-piece, a speaker, a radio, or various combinations of the foregoing. In FIG. 3, communication device 46 is shown as stowed in receiver 64. Communication device 46 can be positioned in various positions in and around headrest 48, backrest 50, housing 56, and/or seat 44. Communication device 46 may also be stowed in various orientations including a vertical or horizontal orientation of a major axis of handset 60 relative to seat 44.

Housing 56 also includes opening manifold 66. Opening manifold 66 provides an opening into housing 56 and cord 62 extends into housing 56 through opening manifold 66. In FIG. 3, opening manifold 66 is located on outer surface 58 of housing 56, but may also be located in various positions in and around headrest 48, backrest 50, housing 56, and/or seat 44.

Opening manifold 66 can be mounted onto seat 44 facing forwards or sideways from seat 44. Opening manifold 66 includes large smooth edges to ease the exit and entry of cord 62. Cord 62 is drawn into and through opening manifold 66 by the coiled shape and corresponding spring-like qualities of cord 62.

Figure 4:
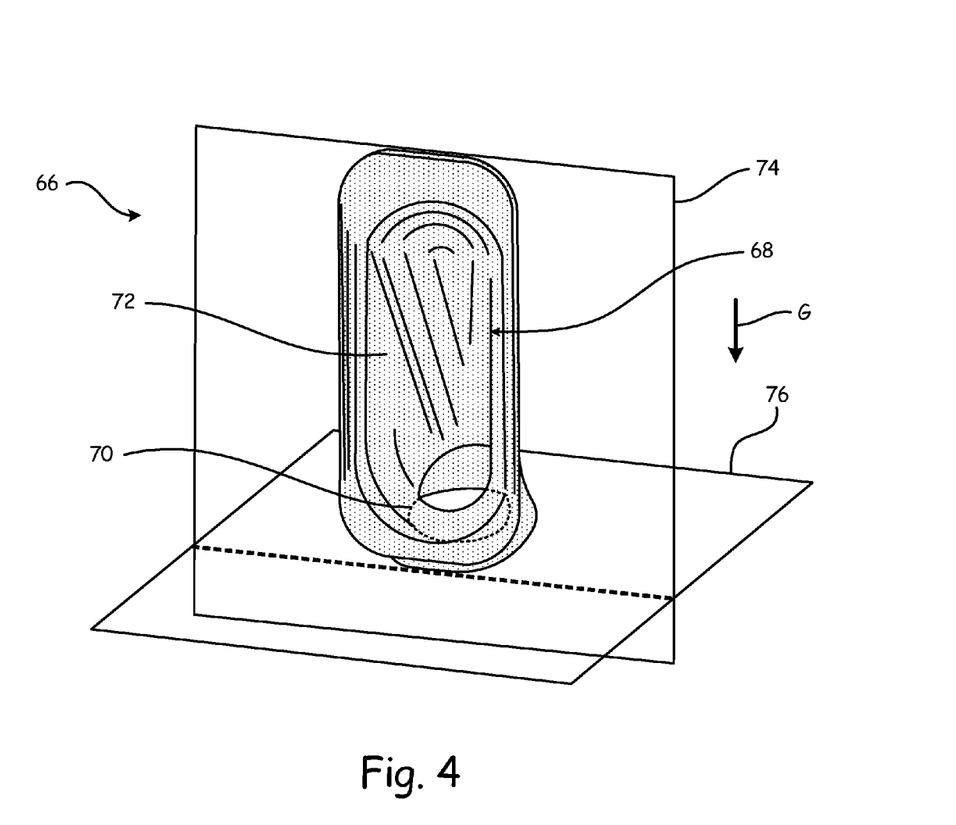
FIG. 4 is a perspective view of an opening manifold.

FIG. 4 is a perspective view of opening manifold 66. Opening manifold 66 includes first aperture 68, second aperture 70, and surface 72 of opening manifold 66. Surface 72 of opening manifold 66 extends from first aperture 68 to second aperture 70. Surface 72 of opening manifold 66 can include a funnel shape and is used to guide cord 62 through opening manifold 66.

First aperture 68 extends across first plane 74. Second aperture 70 extends across second plane 76. First plane 74 and second plane 76 are generally orthogonal to each other, but may also include other non-orthogonal angles. Gravity includes direction of gravity G, and direction of gravity G is generally positioned normal to second plane 76.

Opening manifold 66 allows for saving space around headrest 48 required for maneuvering cord 62 in opening manifold 66. The curl of surface 72 between first aperture 68 and second aperture 70 can be minimized so as to provide smooth edges along an interior and exterior of opening manifold 66 which limits the amount of surfaces cord 62 can get caught on. The reduction in required space to operate opening manifold 66 also enables opening manifold 66 to be positioned at a various distances away from handset 60 and receiver 64 which allows for additional configurations of seat 44.

Figure 5:
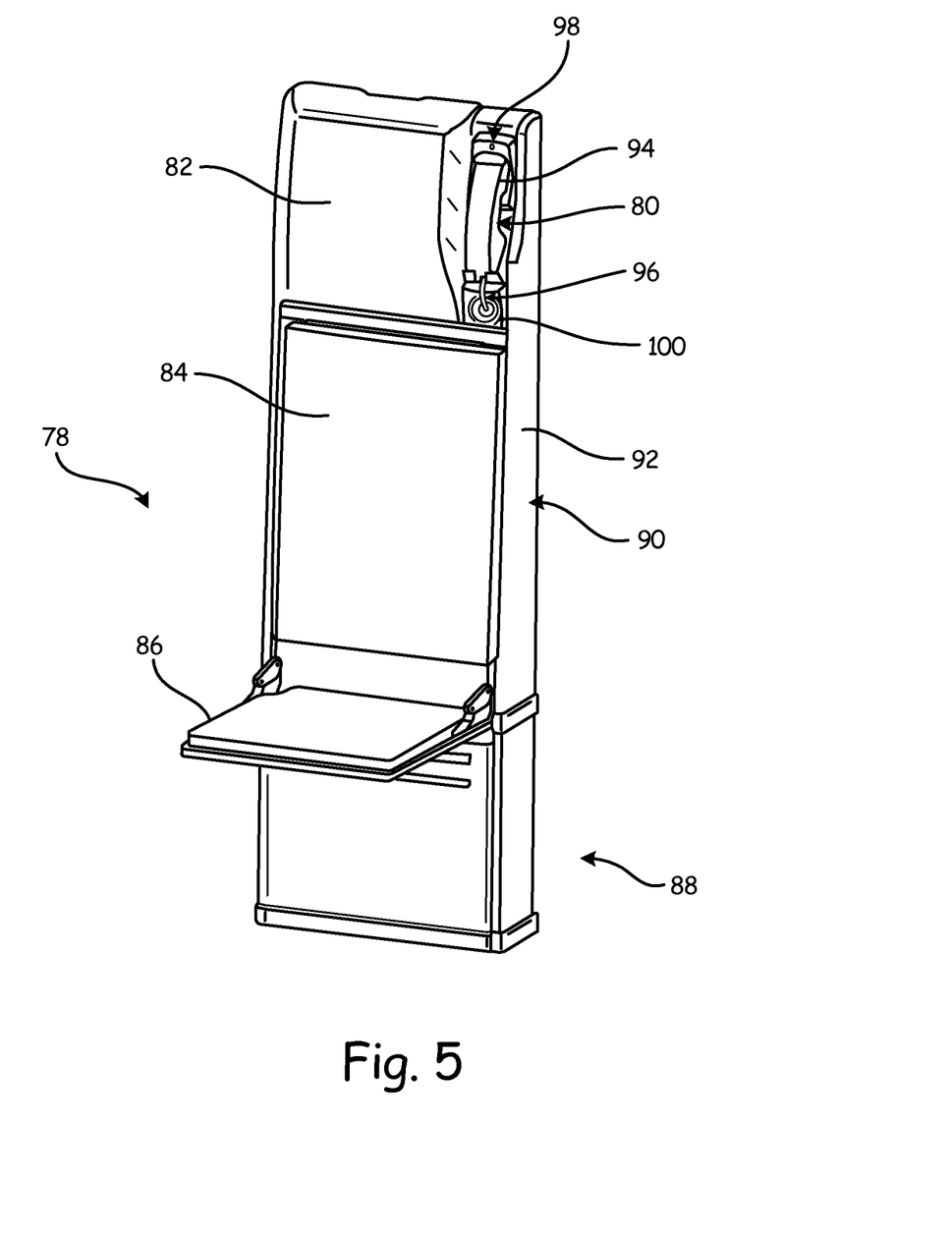
FIG. 5 is a perspective view of a seat with a telephone according to an alternate embodiment of the present disclosure.

FIG. 5 is a perspective view of seat 78 with telephone 80 according to an alternative embodiment of the present disclosure. Seat 78 includes telephone 80, headrest 82, backrest 84, seat bottom 86, and base 88. Seat 78 also includes housing 90 which is positioned behind backrest 84. Headrest 82 is affixed along a top portion of seat 78. Backrest 84 is affixed along a middle portion of seat 78 and onto outer surface 92 of housing 90. Seat bottom 86 is pivotally attached to a lower portion of seat 78. Base 88 includes the bottom portion of seat 78 and connects to the floor of an aircraft (not shown).

Telephone 80 includes handset 94 and cord 96. In FIG. 5, telephone 80 is shown as stowed in receiver 98. Telephone 80 can be positioned in various positions in and around headrest 82, backrest 84, housing 90, and/or seat 78. Telephone 80 may also be stowed in various orientations including a vertical or horizontal orientation of a major axis of handset 94 relative to seat 78.

Housing 90 also includes opening manifold 100. Opening manifold 100 includes a similar configuration as opening manifold 66 of FIG. 4 and includes a first a second plane positioned generally orthogonal to each other and the second plane being positioned generally normal to a direction of gravity. Opening manifold 100 provides an opening into housing 90 and cord 96 extends into housing 90 through opening manifold 100. In FIG. 5, opening manifold is located in a portion of headrest 82, but may also be located in various positions in and around headrest 82, backrest 84, housing 90, and/or seat 78.

Discussion of Possible Embodiments

The following are non-exclusive descriptions of possible embodiments of the present disclosure.

A storage assembly may include a housing with an opening manifold on an outer surface of the housing. The opening manifold may be capable of receiving a cord. A first end of the cord may be connected to an electrical outlet disposed within the housing. The opening manifold may include a first aperture and a second aperture. The first aperture may extend across a first plane. The second aperture may extend across a second plane positioned substantially orthogonal to the first plane.

The storage assembly of the preceding paragraph can optionally include, additionally and/or alternatively, any one or more of the following features, configurations and/or components:

a further embodiment of the foregoing storage assembly, wherein a second end of the cord may be connected to a communication device;

a further embodiment of the foregoing storage assembly, wherein the communication device may include a handset of a telephone;

a further embodiment of the foregoing storage assembly, wherein the storage assembly may be connected to a seat of an aircraft;

a further embodiment of the foregoing storage assembly, wherein the seat may include a jump-seat;

a further embodiment of the foregoing storage assembly, wherein the opening manifold may be disposed in a backrest of the seat;

a further embodiment of the foregoing storage assembly, wherein the opening manifold may be disposed adjacent to a headrest of the seat; and/or a further embodiment of the foregoing storage assembly, wherein the second plane may be positioned generally normal to a direction of gravity.

An alternative embodiment of a storage assembly may include a housing connected to a seat of an aircraft. An opening manifold may be disposed on an outer surface of the housing. The opening manifold may include a first aperture and a second aperture. The first aperture may extend across a first plane. The second aperture may extend across a second plane positioned substantially orthogonal to the first plane. The second aperture may be further positioned generally normal to a direction of gravity. A cord may extend through the opening manifold. A first end of the cord may be connected to an electrical outlet disposed within the housing and a second end of the cord may be connected to a communication device.

The storage assembly of the preceding paragraph can optionally include, additionally and/or alternatively, any one or more of the following features, configurations and/or additional components:

a further embodiment of the foregoing storage assembly, wherein the communication device may include a handset of a telephone;

a further embodiment of the foregoing storage assembly, wherein the seat may include a jump-seat;

a further embodiment of the foregoing storage assembly, wherein the opening manifold may be disposed in a backrest of the seat; and/or a further embodiment of the foregoing storage assembly, wherein the opening manifold may be disposed adjacent to a headrest of the seat.

A method of storage may include connecting a housing to a seat of an aircraft. An opening manifold may be disposed on an outer surface of the housing. The opening manifold may include a first aperture and a second aperture. The first aperture may extend across a first plane. The second aperture may extend across a second plane positioned substantially orthogonal to the first plane and generally normal to a direction of gravity.

The method of storing a cord of the preceding paragraph can optionally include, additionally and/or alternatively, any one or more of the following features, configurations and/or additional components:

a further embodiment of the foregoing method of storage may further include connecting a first end of the cord to an electrical outlet in the housing;

a further embodiment of the foregoing method of storage may further include connecting a second end of the cord to a communication device;

a further embodiment of the foregoing method of storage may further include disposing the opening manifold in a backrest of the seat;

a further embodiment of the foregoing method of storage may further include disposing the opening manifold adjacent to a headrest of the seat; and/or a further embodiment of the foregoing method of storage wherein the cord may be retracted into the housing and a portion of the cord may be stored in the housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A storage assembly for storing a cord, the storage assembly comprising:
    a housing; and
    an opening manifold disposed on an outer surface of the housing, wherein the opening manifold is capable of receiving the cord, wherein a first end of the cord is connected to an electrical outlet disposed within the housing, the opening manifold comprising:
        a first aperture extending across a first plane, wherein the first aperture includes a front facing and elongated opening;
        a second aperture extending across a second plane, wherein the second plane is positioned substantially orthogonal to the first plane, wherein the second aperture includes a horizontal and circular opening that is smaller than the first opening and is below and rearward of the first opening; and
        a recessed surface extending from an upper end of the first aperture to a lower end of the first aperture and to the second aperture and from a first side of the first aperture to a second side of the first aperture, wherein the surface defines a funnel that connects and creates a passage between the first aperture and the second aperture.

2. The storage assembly of claim 1, wherein a second end of the cord is connected to a communication device.

3. The storage assembly of claim 1, wherein the communication device includes a handset of a telephone.

4. The storage assembly of claim 1, wherein the storage assembly is connected to a seat of an aircraft.

5. The storage assembly of claim 4, wherein the seat includes a jump-seat.

6. The storage assembly of claim 4, wherein the opening manifold is disposed in a backrest of the seat.

7. The storage assembly of claim 4, wherein the opening manifold is disposed adjacent to a head-rest of the seat.

8. The storage assembly of claim 1, wherein the second plane is positioned generally normal to a direction of gravity.

9. A storage assembly comprising:
    a housing connected to a seat of an aircraft;
    an opening manifold disposed on an outer surface of the housing, the opening manifold comprising:
        a first aperture extending across a first plane, wherein the first aperture includes a front facing and elongated opening;
        a second aperture extending across a second plane, wherein the second plane is positioned substantially orthogonal to the first plane, and further wherein the second plane is positioned generally normal to a direction of gravity, wherein the second aperture includes a horizontal and circular opening that is smaller than the first opening and is below and rearward of the first opening;
        a recessed surface extending from an upper end of the first aperture to a lower end of the first aperture and to the second aperture and from a first side of the first aperture to a second side of the first aperture, wherein the surface defines a funnel that connects and creates a passage between the first aperture and the second aperture; and
    a cord extending through the opening manifold, wherein a first end of the cord is connected to an electrical outlet disposed within the housing and a second end of the cord is connected to a communication device.

10. The storage assembly of claim 9, wherein the communication device includes a handset of a telephone.

11. The storage assembly of claim 9, wherein the seat includes a jump-seat.

12. The storage assembly of claim 9, wherein the opening manifold is disposed in a backrest of the seat.

13. The storage assembly of claim 9, wherein the opening manifold is disposed adjacent to a headrest of the seat.

14. A method of storage, the method comprising:
    connecting a housing to a seat of an aircraft, wherein an opening manifold is disposed on an outer surface of the housing, the opening manifold including comprising:
        a first aperture extending across a first plane, wherein the first aperture includes a front facing and elongated opening;
        a second aperture extending across a second plane, wherein the second plane is positioned substantially orthogonal to the first plane, and wherein the second aperture includes a horizontal and circular opening that is smaller than the first opening and is below and rearward of the first opening;
        a recessed surface extending from an upper end of the first aperture to a lower end of the first aperture and to the second aperture and from a first side of the first aperture to a second side of the first aperture, wherein the surface defines a funnel that connects and creates a passage between the first aperture and the second aperture; and positioning the second plane substantially orthogonal to the first plane and generally normal to a direction of gravity.

15. The method of claim 14 further comprising connecting a first end of a cord to an electrical outlet in the housing.

16. The method of claim 15 further comprising connecting a second end of the cord to a communication device.

17. The method of claim 14 further comprising disposing the opening manifold in a backrest of the seat.

18. The method of claim 14 further comprising disposing the opening manifold adjacent to a headrest of the seat.

19. The method of claim 14 further comprising retracting a cord into the housing and storing a portion of the cord in the housing.

* * * * *

UNITED STATES PATENT AND TRADEMARK OFFICE
CERTIFICATE OF CORRECTION

PATENT NO. : 9,718,551 B2  
APPLICATION NO. : 14/801112  
DATED : August 1, 2017  
INVENTOR(S) : Bradley Mastrolia

Page 1 of 1

It is certified that error appears in the above-identified patent and that said Letters Patent is hereby corrected as shown below:

In the Specification

Column 6, Line 54:
Delete "including"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*